United States Patent
Dutta et al.

(10) Patent No.: US 11,526,429 B1
(45) Date of Patent: Dec. 13, 2022

(54) IDENTIFYING CRITICAL METHODS AND CRITICAL PATHS IN SOFTWARE CODE

(71) Applicant: SAP SE, Walldorf (DE)

(72) Inventors: Amrit Shankar Dutta, Purulia (IN); Amitabh Goswami, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/464,377

(22) Filed: Sep. 1, 2021

(51) Int. Cl.
 *G06F 11/36* (2006.01)
(52) U.S. Cl.
 CPC .............................. *G06F 11/3684* (2013.01)
(58) Field of Classification Search
 None
 See application file for complete search history.

(56) References Cited

U.S. PATENT DOCUMENTS

| 8,745,606 | B2 * | 6/2014 | Guo | G06F 8/443 717/156 |
| 11,327,877 | B2 * | 5/2022 | Joshi | G06F 11/3688 |

OTHER PUBLICATIONS

Yusuf Ozkaya et al., Active Betweeness Cardinality: Algorithm and Applications, arXiv, 2017, retrieved online on Sep. 19, 2022, pp. 1-13. Retrieved from the Internet: <URL: https://arxiv.org/pdf/1711.10634.pdf> (Year: 2017).*
C. Tang, M. Lu and S. Kong, "An Identification Method for Critical Nodes of Fault Propagation Based on Software Dynamic Execution Network," 2019 IEEE 10th International Conference on Software Engineering and Service Science (ICSESS), 2019, pp. 249-255, doi: 10.1109/ICSESS47205.2019.9040710. (Year: 2019).*
Wikipedia, "Betweenness centrality," <https://en.wikipedia.org/wiki/Betweenness_centrality>, 6 pages (accessed Jul. 28, 2021).
Wikipedia, "Closeness centrality," < https://en.wikipedia.org/wiki/Closeness_centrality>, 4 pages (accessed Jul. 28, 2021).
Wikipedia, "Hierarchical closeness," < https://en.wikipedia.org/wiki/Hierarchical_closeness>, 2 pages (accessed Jul. 28, 2021).
Wikipedia, "Centrality," < https://en.wikipedia.org/wiki/Centrality>, 17 pages (accessed Jul. 28, 2021).

* cited by examiner

*Primary Examiner* — Hanh Thi-Minh Bui
(74) *Attorney, Agent, or Firm* — Klarquist Sparkman, LLP

(57) ABSTRACT

Technologies are described for identifying critical methods in a software code base. The critical methods are identified using a call graph that is generated from the software code base. The call graph comprises method nodes that correspond to the methods of the software code base. One or more algorithms are applied to the call graph to calculate values for the method nodes of the call graph. The one or more algorithms comprise a betweenness centrality algorithm, a harmonic closeness centrality algorithm, or a NodeRank centrality algorithm. From the values generated by the algorithms, criticality scores are determined for the method nodes. The criticality scores are then used to determine which of the method nodes are critical method nodes. Indications of the critical method nodes can be output.

13 Claims, 7 Drawing Sheets

Figure 3

|  | M1 | M2 | M3 | M4 | M5 | M6 | M7 | M8 | M9 | M10 | M11 | M12 |
|---|---|---|---|---|---|---|---|---|---|---|---|---|
| M1 | 0 | 1 | 0.5 | 0.33 | 0 | 0 | 0 | 0 | 0 | 0 | 0 | 0 |
| M2 | 1 | 0 | 1 | 1 | 0 | 0 | 0 | 0 | 0 | 0 | 0 | 0 |
| M3 | 0.5 | 1 | 0 | 0 | 0 | 0 | 0 | 0 | 0 | 0 | 0 | 0 |
| M4 | 0.33 | 0.5 | 1 | 0 | 0 | 0 | 0 | 0 | 0 | 0 | 0 | 0 |
| M5 | 0 | 0 | 0 | 0 | 0 | 1 | 0.5 | 0.5 | 0.33 | 0.25 | 0 | 0 |
| M6 | 0 | 0 | 0 | 0 | 0.5 | 0 | 0 | 1 | 0.5 | 0.33 | 0 | 0 |
| M7 | 0 | 0 | 0 | 0 | 0.5 | 1 | 0 | 0.5 | 1 | 0.5 | 0 | 0 |
| M8 | 0 | 0 | 0 | 0 | 0.33 | 0.5 | 1 | 0.5 | 0 | 1 | 0 | 0 |
| M9 | 0 | 0 | 0 | 0 | 0.025 | 0.33 | 0.5 | 0.5 | 0 | 0 | 0 | 0 |
| M10 | 0 | 0 | 0 | 0 | 0 | 0 | 0 | 0 | 0 | 0 | 0 | 0 |
| M11 | 0 | 0 | 0 | 0 | 0 | 0 | 0 | 0 | 0 | 0 | 0 | 1 |
| M12 | 0 | 0 | 0 | 0 | 0 | 0 | 0 | 0 | 0 | 0 | 1 | 0 |
| Total | 1.83 | 2.5 | 2.5 | 1.83 | 2.58 | 3.83 | 3.5 | 3.5 | 3.83 | 2.58 | 1 | 1 |
| Total/11 | 0.166 | 0.227 | 0.227 | 0.166 | 0.235 | 0.348 | 0.318 | 0.318 | 0.348 | 0.235 | 0.091 | 0.091 | ural
IDENTIFYING CRITICAL METHODS AND CRITICAL PATHS IN SOFTWARE CODE

BACKGROUND

Software development is often an iterative process during which software code is generated on a local computing device or hosted software development environment. The generated software code is committed to a code repository. The software code (also referred to as a codebase) is then tested to identify errors. In some cases, the testing is performed using test cases which are applied to the codebase in the code repository. Running test cases against a codebase can take a significant amount of time and consume a significant amount of computing resources.

In some situations, it may be difficult to identify which portions of the software code are more important (e.g., that have the ability to significantly affect operation of the software application). Without knowing which portions of the software code are more important, development and testing effort may be applied inefficiently. For example, a software developer may focus development or review time on a portion of the software code (e.g., on particular methods) that do not significantly affect the operation of the software application or that affect the operation of the software application less than other portions of the software code. This can result in inefficient use of testing and/or developer effort as well as reduced software quality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for identifying critical methods in a software code base. For example, the technologies can comprise obtaining a call graph comprising a plurality of call sequences, where the call graph comprises method nodes corresponding to methods in the software code base, and where the method nodes represent control flow relationships between the methods in the software code base. The technologies can comprise using a betweenness centrality algorithm to calculate betweenness centrality values for the method nodes of the call graph, using a harmonic closeness centrality algorithm to calculate closeness centrality values for the method nodes of the call graph, and/or using a NodeRank centrality algorithm to calculate NodeRank centrality values for the method nodes of the call graph. The technologies can comprise determining criticality scores for the method nodes based at least in part on the betweenness centrality values, the harmonic closeness centrality values, and/or the NodeRank centrality values. The technologies can comprise determining which of the method nodes are critical method nodes based at least in part on the criticality scores for the method nodes. The technologies can comprise outputting an indication of the critical method nodes.

BRIEF DESCRIPTION OF THE DRAWINGS

FIG. 3 is a diagram depicting example harmonic closeness centrality scores for method nodes of a call graph.

DETAILED DESCRIPTION

Overview

The following description is directed to technologies for identifying critical methods and/or critical call sequences in a software code base. The critical methods and/or call sequences are identified using a call graph that is generated from the software code base. The call graph comprises method nodes that correspond to the methods of the software code base (e.g., a one-to-one correspondence between the methods and the method nodes) and the method nodes are organized into call sequences. One or more centrality algorithms are applied to the call graph to calculate values for the method nodes of the call graph. The one or more centrality algorithms comprise a betweenness centrality algorithm, a harmonic closeness centrality algorithm, or a NodeRank centrality algorithm. From the values generated by the algorithms, criticality scores are determined for the method nodes. The criticality scores are then used to determine which of the method nodes are critical method nodes. Critical call sequences can also be identified based on the critical method nodes. Indications of the critical method nodes and/or critical call sequences can be output.

Using the technologies described herein, critical method nodes and/or critical call sequences can be automatically determined using a call graph by using various centrality algorithms. By automatically determining critical method nodes and/or critical call sequences, software development and testing can be performed more efficiently. For example, automated testing can be performed by identifying and initiating specific test cases and/or an entire test suite according to the critical method nodes and/or critical call sequences. Development effort, code review, and/or manual testing can also be directed based on which methods and/or call sequences of the code base have been identified as critical and/or based on whether a change set (e.g., from a code commit) includes such methods.

Example Environment for Identifying Critical Method Nodes and Critical Call Sequences in a Software Code Base In the technologies described herein, environments can be provided for identifying critical method nodes and/or critical call sequences in a software code base. The critical method nodes and/or critical call sequences are identified based on analysis of a call graph and calculation of values by various centrality algorithms, including a betweenness centrality algorithm, a harmonic closeness centrality algorithm, and/or a NodeRank centrality algorithm.

Figure 1:
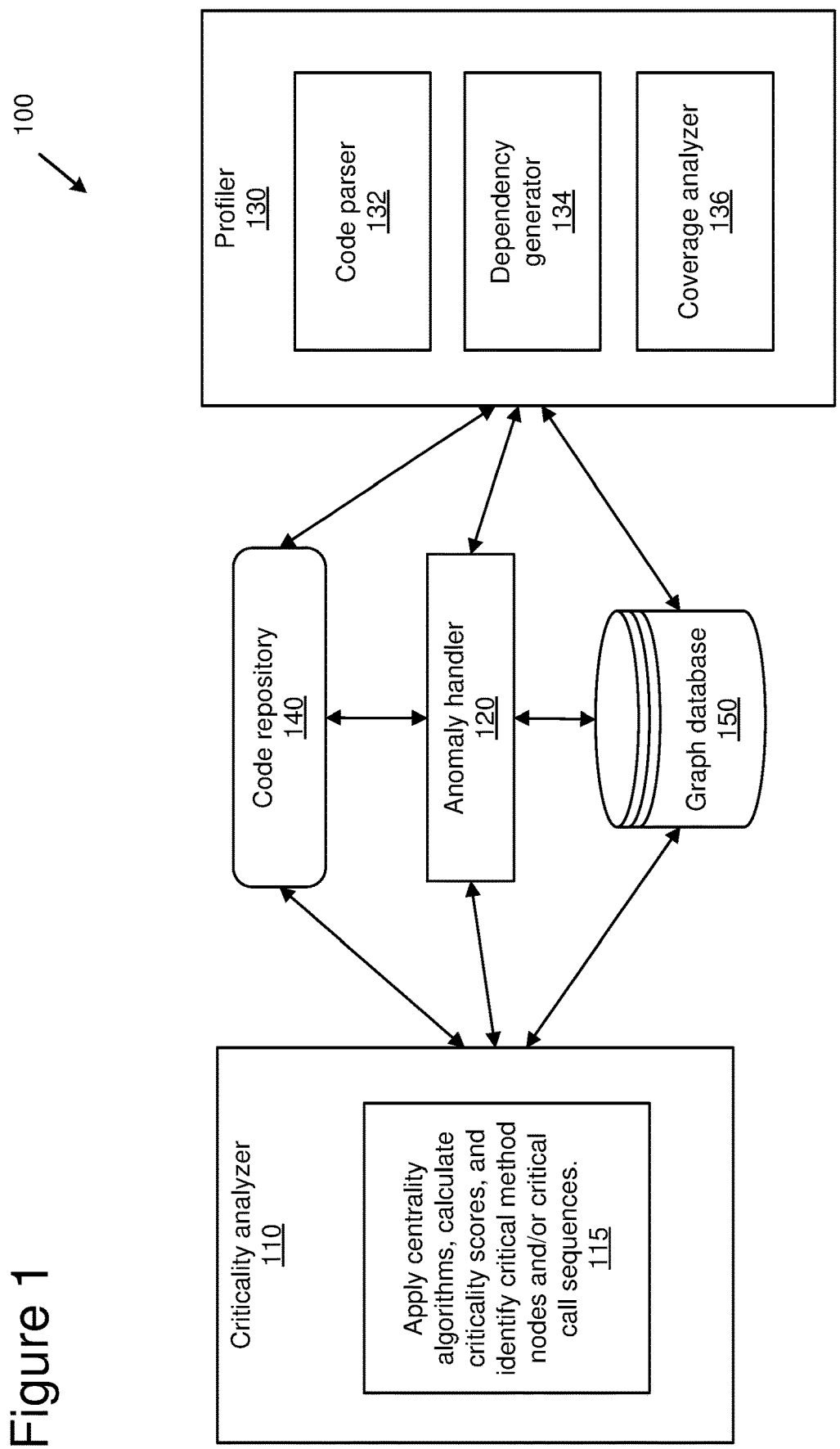
FIG. 1 is a diagram illustrating an architecture for determining critical methods and critical call sequences using centrality algorithms.

FIG. 1 is an example environment 100, comprising various components for generating a call graph from a software code base and identifying critical method nodes using the structure of the call graph. The various components of the example environment 100 can be implemented by software and/or hardware resources.

Specifically, the example environment 100 depicts components including a criticality analyzer 110, an anomaly handler 120, and a profiler 130. These components 110, 120, 130 can be implemented using various types of software resources (e.g., web browser resources, application software, database software, etc.) and run on various types of hardware resources (e.g., computing devices such as desktops, servers, and laptops, virtual computing resources, cloud computing resources, etc.). For example, one or more of the components can be implemented as a web service or cloud service.

The components 110, 120, 130 can also be in communication with a code repository 140 which can take various forms including, a dedicated database or a software-as-a-service cloud-based code development management platform (e.g., GITHUB). The profiler 130 can generate and save relevant data from source code, byte code, and test coverage reports in the filesystem. The criticality analyzer 110 can identify critical methods and/or call sequences depending on call graphs generated by the profiler 130. The architecture can also include a code change analyzer (not depicted) that provides test case recommendations depending on the code base changes and data collected by the profiler 130. Further, the architecture can include a graph database 150 which can store the call graphs as provided herein.

The anomaly handler 120 can be used to handle less frequent situations such as a code change implicating more than 30% of the test cases or a code change having a number of files above a pre-defined threshold (e.g., five or more files). In such cases, a user can manually specify which test cases to execute or other exceptional handling can be performed with regard to the corresponding code changes. In other words, the anomaly handler 120 can handle deviations or take actions depending on a certain rule being triggered to fine tune the overall system. The anomaly handler 120 can execute a stitching algorithm as described below.

The profiler 130 can maintain or access information about the code base (also referred to as the software code base) in the code repository 140 including changes (sometimes referred to as deltas) which occur in between versions or other user-defined commits. The profiler 130 can also generate (e.g., by dependency generator 134) a call graph (as described in further detail below) which can be a bi-directional nth level call graph. Using the call graph, the profiler 130 can also generate the coverage per test case (e.g., by the coverage analyzer 136). Coverage, in this regard, refers to which methods forming part of the code base are affected by (e.g., tested by) a particular test case (which is called "covered by").

The criticality analyzer 110 can identify critical methods and/or call sequences depending on the generated call graphs. For example, the criticality analyzer 110 performs operations for analyzing a call graph, applying centrality algorithms, calculating criticality scores, and identifying critical method nodes and/or critical call sequences, as depicted at 115. Indications of the critical method nodes and/or the critical call sequences can be output. For example, test cases can be automatically initiated based on the identified critical method nodes and/or critical call sequences.

The code change analyzer can parse a commit provided by a revision control tool using a code parser 112 in connection with a code analyzer (not depicted) to identify deltas of the code base in the code repository 140. The code change analyzer provides the file(s) that are modified along with the method(s). This set of files and its method are passed to the code analyzer module for further analysis. The code analyzer can return the changes in terms of classes, methods or lines. In some variations, the delta changes can be characterized in terms of changes to methods. In other variations, different granularities of changes can be characterized such as on a line-by-line basis. In such cases, the nodes of a directed graph would represent lines of code.

A source code parser 132 parses the source code to create some form of internal representation. The source code parser takes source code as input data and builds a data structure in the form of a parse tree, AST (Abstract Syntax Tree) or other hierarchical structure, giving a structural representation of the input source code. AST provides detailed information about all attributes/elements of JAVA source code. This representation can provide the package name of source code, import statements, type of source code (class/interface), internal attributes of class/interface (e.g., methods, constructors or field declaration), as well as start line and end line for each attribute.

Call graphs, in this context, are directed graphs representing control flow relationships amongst the methods of a software code base (e.g., representing a software application or program). The nodes of the graph are the methods, while an edge from node 'node1' to node 'node2' indicates that method 'node1' invokes method 'node2'. The call graph can be generated by converting the source code forming part of the code base into an AST representation.

In a call graph, each method node corresponds to a different method of the code base (e.g., a first method node corresponds to a first method of the code base, a second method node corresponds to a second method of the code base, and so on). The edges connecting the method nodes are defined by the caller and callee relationship (e.g., as specified in the byte code). By tracing the complete call sequence of the methods in the code base, these methods exhibit the structure of a graph. In some implementations, a self-loop is legal in the call graph (e.g., a method calling itself).

In the technologies described herein, a code base can be analyzed to identify the methods and their relationships (e.g., "called by" relationships). As discussed above, a call graph can then be generated. The call graph can represent just the methods of the code base or it can also include test case nodes. The call graph can be generated on demand (e.g., when analysis of the code base is being performed regardless of whether there has been a recent code change) or triggered based on some event (e.g., upon a code commit).

As mentioned above, one variation is to analyze the code changes since a last commit (e.g., a last git commit) to identify a set of methods that have code changes. A call graph can then be reviewed to determine all related methods that should be probed as potentially being covered by a test case. The full result set of recommended test cases can be provided in various manners including loading into memory, storing in physical persistence, displaying a graphical user interface, transmitted to a remote computing system, and the like.

In some cases, the call graph can be stored in the graph database 150. A graph database 150, in this regard, refers to a database that uses graph structures for semantic queries for nodes, edges, and properties to represent and store data. The graph database 150 can provide a more rapid response time and can take various forms.

In some cases, the call graph may initially have disconnected nodes. Such idiosyncrasies can appear in the code base due to implementation of non-standard design patterns, JAVA reflections, runtime weaving, etc. These disconnects can be problematic in that interrelations amongst the method nodes may not be adequately captured. A stitching algorithm can be utilized to add edges to disconnected method nodes in the call graph.

The stitching algorithm can be used to connect disconnected method nodes.

Pseudocode for the stitching algorithm can be as follows. Algorithm:
Initialize:
Set D:={All standard and non-standard design patterns which are not discoverable by static code analyzer}
Repeat for each Design Pattern D1 belonging to Set D
1) Set CALLED:=Find out the set of methods nodes which should be called in runtime depending on D1.
2) Set CALLEE:=Find out the set of methods nodes which should be calling above methods in runtime depending on D1.
3) IF both the set CALLED and CALLEE is non-empty go to step 4, otherwise CONTINUE.
4) Add directed edges to the set of nodes identified by CALLEE from the set of nodes identified by CALLED.

For example, with a particular exemplary application XYZ, ABC is a popular design pattern. ABC is invoked by instantiating an ABC object and passing it to an ABC handler. ABC handler can try to find the implementation by appending 'Impl' at the end of the ABC object name and discover it in specific packages. The profiler 130, in this situation, cannot create a complete call graph out of it. Thus, the stitching algorithm can find an immediate caller of ABC constructor and can stitch it to the method node corresponding to the ABC implementer in the call graph. Now, the ABC implementation becomes a participant at the end to end call graph.

Example Critical Method Nodes and Critical Call Sequences

In the technologies described herein, critical method nodes and/or critical call sequences can be identified via analysis of call graphs. A critical method node is a method node that may be more important to a software code base than a non-critical method node (based on analysis using centrality algorithms) Using a calculated criticality score for a given method node (which corresponds to a given method), the given method node is considered a critical method node when it has a criticality score above a criticality threshold. In some implementations, the criticality threshold is a predefined constant (e.g., set to a specific percentile). In some implementations, the criticality threshold is set to the mean of the criticality scores of the method nodes.

A critical path is a call sequence that contains one or more critical method nodes. Therefore, each call sequence of a call graph that contains at least one critical method node is a critical path (also referred to as a critical call sequence).

Example Determination of Criticality Scores

In the technologies described herein, various algorithms (e.g., various centrality algorithms) can be used to determine criticality scores for method nodes and/or call sequences within a call graph. In some implementations three different algorithms are used to generate scores for the method nodes of the call graph. In other implementations, a different number of algorithms can be used.

One example algorithm that can be used in the criticality score calculation is the betweenness centrality algorithm. For the betweenness centrality algorithm, the unweighted shortest paths between all pairs of method nodes in the call graph are first derived. Then, each method node is assigned a score which is the number of such shortest paths that pass through the method node. In some implementations, the betweenness centrality algorithm is implemented using the following equation.

$$\text{Betweenness centrality value(method node)} = \text{Number of shortest paths passing through the method node}$$

Another example algorithm that can be used is the closeness centrality algorithm. With the closeness centrality algorithm, for a given method node the average farness to all other method nodes is derived first. Here, farness is the inverse of the distance. These values are then summed up to derive a numeric score for each method node in the call graph. The higher the score, the closer the method node is from other method nodes (as it is the sum of inverse distances). There are multiple versions of the closeness centrality algorithm. In some implementations, the harmonic closeness centrality version of the algorithm is used because it can provide better results when analyzing a call graph with a number of disconnected call graph call sequences. The harmonic closeness centrality variation sums the individual "inverse of the distance" values, and then normalizes the value by dividing it by the total number of method nodes (minus one) present in the whole call graph. The distance to a disconnected method node (because it is in a different call sequence) is represented as "0". In some implementations, the harmonic closeness centrality algorithm is implemented using the following equation.

$$\text{Harmonic closeness centrality value(method node)} = \text{sum}(1/\text{distance from method node to every other method node excluding itself})$$

$$\text{Normalized harmonic closeness centrality value (method node)} = \text{Harmonic closeness centrality value(method node)}/(\text{number of method nodes}-1)$$

Another example algorithm that can be used is the PageRank centrality algorithm. The PageRank centrality algorithm is used to find out the secondary influences of the method nodes. Here "secondary influences" means a specific method node's importance is derived from the method nodes it is connected to. The specific variation of the PageRank centrality algorithm described herein is referred to as the NodeRank centrality algorithm.

The NodeRank (NR) centrality algorithm reveals the secondary importance of nodes, which is based on the following components:

The number of nodes that have edges incoming (IC) to the 'node under consideration' (for example, N1), which can be expressed as: $IC_1, IC_2, \ldots IC_n$.

The number of outgoing edges (OE) these incoming nodes have, which can be expressed as: $OE(IC_1), OE(IC_2) \ldots OE(IC_n)$.

A factor that will determine amount of impact of these incoming nodes will have on the NodeRank, which is referred to as k (a value of 0 for k means that there is no impact of the number of incoming nodes, while a value of 1 means that the value will be based only on directly connected edges).

Based on the above components, the NodeRank equation for a given node, N1, is:

$$NR(N1) = (1-k) + k[NR(IC_1)/OE(IC_1) + NR(IC_2)/OE(IC_2) + \ldots + NR(IC_n)/OE(IC_n)]$$

The different algorithms typically produce values that differ in scale (e.g., one algorithm may produce whole number values while another algorithm may produce values in the range from 0 to 1). In order to combine the values produced by the different algorithms into a criticality score, the values are normalized using a scaling procedure. In some implementations, the scaling is performing according to the following equation.

$$\text{Scaled value} = \frac{X - \min}{\max - \min}$$

In the above equation, min and max are the minimum and maximum values produced by the given algorithm, respectively, and X is a given input value to be scaled. As an example, if a particular algorithm produces values in the range of 0 to 4, then the scaled value for an input value (X) of 2 would 0.5. In other implementations, a different scaling procedure can be used.

The following equation is used to calculate the criticality score for a given method node.

$$\text{Criticality score} = W_1 * A_1 + W_2 * A_2 + W_3 * A_3$$

The above equation calculates the criticality score using results (e.g., scaled values according to the scaling equation above) from three algorithms, a first algorithm ($A_1$), a second algorithm ($A_2$), and a third algorithm ($A_3$). Each of the algorithms is multiplied by an associated weight. However, in other implementations, a different number of algorithms can be used in the criticality score calculation (e.g., more algorithms, fewer algorithms, and/or different algorithms, each of which can have its associated weight). In some implementations, the first algorithm is the betweenness centrality algorithm, the second algorithm is the harmonic closeness centrality algorithm, and the third algorithm is the NodeRank centrality algorithm (but, it should be understood that the order of the algorithms in the equation does not matter).

The weights can be automatically determined and/or user configurable values. In some implementations, the weights are automatically determined using a machine learning model (e.g., a machine learning model that has been trained with training data comprising determined criticality scores) or linear regression. Depending on the implementation, calculation of the criticality scores may or may not use weights. For example, weights may not be used for any of the algorithms, or weights may only be used for one or more (but not all) of the algorithms.

The criticality scores of the method nodes can be used to order the method nodes (e.g., from highest criticality score to lowest criticality score). The critical method nodes can be identified as those method nodes with a criticality score above a criticality threshold. The critical call sequences can then be identified as those call sequences that contain at least one critical method node.

Critical call sequences can also be compared. In some implementations, an average criticality score is calculated for each critical call sequence by taking the average criticality score for the critical method nodes of the critical call sequence. The critical call sequences can then be ordered (e.g., from highest average criticality score to lowest average criticality score).

Action can be taken based on the identified critical method nodes and/or the identified critical call sequences. In some implementations, test cases to be initiated (run) are automatically determined based at least in part on which of the method nodes have been identified as critical method nodes. For example, the test cases that directly cover the critical method nodes can be selected for initiation (e.g., provided to a test case execution component, provided to a code reviewer, etc.).

In some implementations, test cases to be initiated are automatically determined based at least in part on which of the call sequences have been identified as critical call sequences. For example, the test cases that directly cover at least one method node of the critical call sequences can be selected for initiation (e.g., provided to a test case execution component, provided to a code reviewer, etc.).

In some implementations, an automated decision is made to either run an entire test suite of test cases (e.g., the entire test suite associated with the code base from which the call graph has been generated) or to run fewer test cases than the entire test suite. The decision can be based at least in part on the criticality scores for the method nodes. For example, if there are a significant amount of critical method nodes (e.g., over a threshold percentage of the method nodes are critical method nodes), then an automated decision can be made to run the entire test suite. A similar decision can be made based on the number of critical call sequences (e.g., over a threshold percentage of the call sequences are critical call sequences). As another example, if the average criticality score of the method nodes and/or call sequences is above a threshold, then an automated decision can be made to run the entire test suite.

In some implementations, indications of critical method nodes and/or critical call sequences are used to improve software development and/or code testing activities. For example, the indications can be provided to software developers who can use the indications during code review (e.g., to apply more development or review effort to software code corresponding to the methods corresponding to the critical method nodes). The indications can also be used (e.g., by software developers or code testers) to enhance or expand test coverage (e.g., to develop new test cases covering the identified critical method nodes and/or critical call sequences).

Example Criticality Score Calculation Scenarios

In the technologies described herein, various algorithms can be used to determine criticality scores for method nodes and/or call sequences within a call graph. In some implementations, three centrality algorithms are used in calculating the criticality scores.

Figure 2:
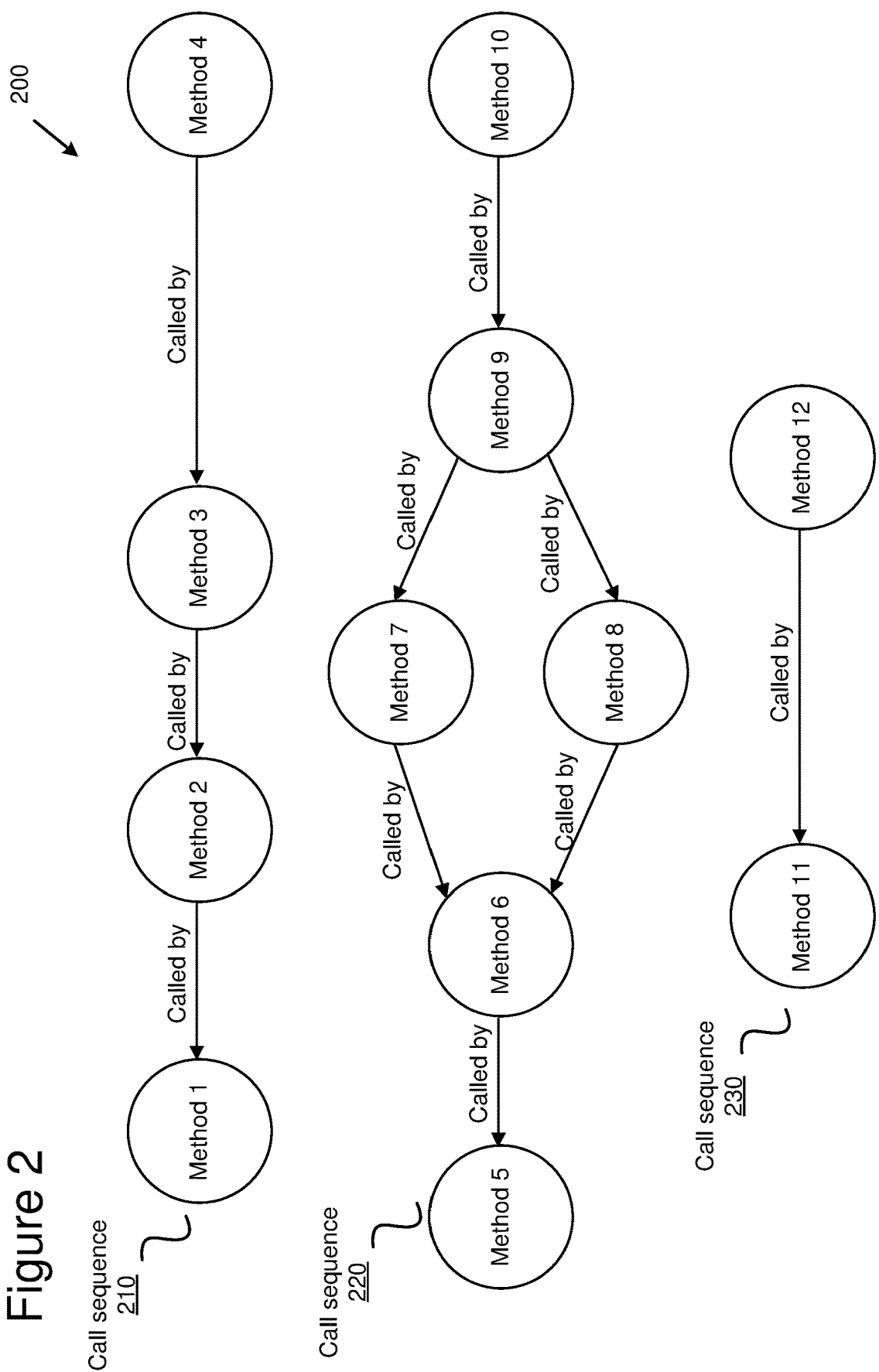
FIG. 2 is a diagram depicting an example call graph comprising multiple call sequences.

FIG. 2 is a diagram depicting an example call graph 200 comprising multiple call sequences. In the example call graph 200, each method (e.g., each method in a code base) is represented as a method node in the call graph, connected with other method nodes by edges named "called by". These edges are unidirectional as a call only occurs in a single direction. For example, in the example call graph 200, method 4 is called by method 3 (in other words, method 3 is calling method 4). The example call graph 200 depicts three call sequences, call sequence 210, call sequence 220, and call sequence 230. Each call sequence is independent of the other call sequences of the call graph. Having a number of call sequences is common for a software application as there can be many independent control flows though the software application.

The following illustrates calculation of scores (values) for the three example algorithms with reference to the example call graph 200. First, scores are calculated for the betweenness centrality algorithm. The following table, Table 1, depicts betweenness centrality (BC) scores for the method nodes depicted in FIG. 2.

TABLE 1

Example betweenness centrality scores

| Method node | Score (BC) |
|---|---|
| Method node 1 | 0 |
| Method node 2 | 2 |
| Method node 3 | 2 |
| Method node 4 | 0 |
| Method node 5 | 0 |
| Method node 6 | 4 |
| Method node 7 | 2 |
| Method node 8 | 2 |
| Method node 9 | 4 |
| Method node 10 | 0 |
| Method node 11 | 0 |
| Method node 12 | 0 |

To illustrate how the betweenness centrality scores are calculated for Table 1, consider the method nodes of call sequence 210. The betweenness centrality algorithm assigns a score according to the number of shortest paths through a given method node. For method node 1, there are no paths through method node 1, so its score is "0". For method node 2, there are two shortest paths through method node 2 (the shortest path from method node 3 to method node 1 passes through method node 2, and the shortest path from method node 4 to method node 1 passes through method node 2), so the score for method node 2 is "2". For method node 3, there are two shortest paths through method node 3 (the shortest path from method node 4 to method node 2 passes through method node 3, and the shortest path from method node 4 to method node 1 passes through method node 3), so the score for method node 3 is "2". For method node 4, there are no paths through method node 4, so its score is "0". The betweenness centrality scores are calculated similarly for the method nodes of call sequences 220 and 230.

FIG. 3 depicts harmonic closeness centrality (HCC) scores, in Table 300, for the method nodes (referred to as "M1" through "M12") depicted in FIG. 2. To illustrate how the harmonic closeness centrality scores are calculated for Table 300, consider the method nodes of call sequence 210. For method node 1 to method node 1, the value is "0". For method node 1 to method node 2, the distance is "1", so the inverse "1/1" results in a harmonic closeness centrality score of "1". For method node 1 to method node 3, the distance is "2", so the inverse is "½" which results in a harmonic closeness centrality score of "0.5". For method node 1 to method node 4, the distance is "3", so the inverse is "⅓" which results in a harmonic closeness centrality score of "0.33". The distance of method node 1 to method nodes 5 through 12 is "0" because they are disconnected (e.g., the distance is technically infinite in this case). The total harmonic closeness centrality score for method 1 is "1.83" which is normalized (by dividing by the total number of method nodes in the call graph minus one, which in this example is 11) to a value of "0.166". The harmonic closeness centrality scores for the other method nodes are calculated similarly.

The following table, Table 2, depicts NodeRank centrality (NRC) scores for the method nodes depicted in FIG. 2. In this example, the NodeRank centrality scores are calculated for six iterations, with the sixth iteration values being used for the NodeRank centrality scores. However, other implementations can use a different number of iterations. In some implementations, the number of iterations to be performed is determined (e.g., automatically determined) based on the conversion of the values. For example, the iterations can stop (and the final iteration used for the values) when the values have substantially converged (e.g., when the differences between the iterations is below a threshold).

TABLE 2

Example NodeRank centrality scores

| Method node | Iter-1 | Iter-2 | Iter-3 | Iter-4 | Iter-5 | Iter-6 |
|---|---|---|---|---|---|---|
| M1 | 0.083 | 0.221 | 0.338 | 0.437 | 0.478 | 0.478 |
| M2 | 0.083 | 0.221 | 0.338 | 0.386 | 0.386 | 0.386 |
| M3 | 0.083 | 0.221 | 0.278 | 0.278 | 0.278 | 0.278 |
| M4 | 0.083 | 0.15 | 0.15 | 0.15 | 0.15 | 0.15 |
| M5 | 0.083 | 0.221 | 0.398 | 0.545 | 0.630 | 0.665 |
| M6 | 0.083 | 0.292 | 0.465 | 0.565 | 0.605 | 0.605 |
| M7 | 0.083 | 0.185 | 0.244 | 0.268 | 0.268 | 0.268 |
| M8 | 0.083 | 0.185 | 0.244 | 0.268 | 0.268 | 0.268 |
| M9 | 0.083 | 0.221 | 0.278 | 0.278 | 0.278 | 0.278 |
| M10 | 0.083 | 0.15 | 0.15 | 0.15 | 0.15 | 0.15 |
| M11 | 0.083 | 0.221 | 0.278 | 0.278 | 0.278 | 0.278 |
| M12 | 0.083 | 0.15 | 0.15 | 0.15 | 0.15 | 0.15 |

The following table, Table 3, lists the scaled values (using the above-described "scaled value" equation) from the example betweenness centrality (BC) scores of Table 1, the harmonic closeness centrality (HCC) scores of Table 300, and the NodeRank centrality (NRC) scores of Table 2 (from the sixth iteration).

TABLE 3

Example scaled values

| | Scaled BC values | Scaled HCC values | Scaled NRC values |
|---|---|---|---|
| Method node 1 | 0 | 0.293 | 0.637 |
| Method node 2 | 0.5 | 0.530 | 0.458 |
| Method node 3 | 0.5 | 0.530 | 0.248 |
| Method node 4 | 0 | 0.293 | 0 |
| Method node 5 | 0 | 0.558 | 1 |
| Method node 6 | 1 | 1 | 0.885 |
| Method node 7 | 0.5 | 0.883 | 0.229 |
| Method node 8 | 0.5 | 0.883 | 0.229 |
| Method node 9 | 1 | 1 | 0.248 |
| Method node 10 | 0 | 0.558 | 0 |
| Method node 11 | 0 | 0 | 0.248 |
| Method node 12 | 0 | 0 | 0 |

The following table, Table 4, lists the criticality scores (using the above-described "criticality score" equation) using the scaled values from Table 3. For ease of illustration, the weights for each algorithm are 1.0. However, in other implementations, different weights can be used (e.g., each algorithm can have its associated weight independent of the other algorithms). In addition, the method nodes in Table 4 have been sorted based on their criticality scores, from highest to lowest.

TABLE 4

Example criticality scores

|  | Criticality Score |
| --- | --- |
| Method node 6 | 2.89 |
| Method node 9 | 2.248 |
| Method node 7 | 1.613 |
| Method node 8 | 1.613 |
| Method node 5 | 1.558 |
| Method node 2 | 1.488 |
| Method node 3 | 1.278 |
| Method node 1 | 0.931 |
| Method node 10 | 0.558 |
| Method node 4 | 0.293 |
| Method node 11 | 0.248 |
| Method node 12 | 0.0 |

Using the criticality scores of Table 4, the critical method nodes can be identified by comparing the criticality scores to a criticality threshold. For example, if the criticality threshold is 2.80, then only one method node, method node 6, would be identified as a critical method node because its criticality score is 2.89 (above the threshold of 2.80). From the critical method nodes, the critical call sequences (also referred to as critical paths) can be identified. There are three call sequences present in the call graph depicted in FIG. 2. In this example, the only critical method node is method node 6, which is part of call sequence 220. Therefore, call sequence 220 is a critical call sequence. The other call sequences, call sequence 210 and call sequence 230, do not contain any critical method nodes, so they are not critical call sequences.

As another example, if the criticality threshold is 1.40, then there would be six method nodes identified as critical method nodes (method nodes 6, 9, 7, 8, 5, and 2) based on the criticality scores of Table 4. In this scenario, call sequences 210 (because it contains method node 2) and call sequence 220 (because it contains method nodes 6, 9, 7, 8 and 5) would be identified as critical call sequences.

In some implementations, percentiles are determined from the criticality scores. Table 5 depicts examples percentiles calculated from the example criticality scores of Table 4.

TABLE 5

Example percentiles

| Percentile | Criticality Score |
| --- | --- |
| 0 | 0 |
| 0.1 | 0.252 |
| 0.2 | 0.346 |
| 0.3 | 0.670 |
| 0.4 | 1.069 |
| 0.5 | 1.383 |
| 0.6 | 1.530 |
| 0.7 | 1.596 |
| 0.8 | 1.612 |
| 0.9 | 2.184 |
| 0.95 | 2.535 |
| 1 | 2.885 |

Critical method nodes and/or critical call sequences can be determined based on the example percentiles of Table 5. For example, if the percentile for critical method nodes is set to the 95$^{th}$ percentile, then any method nodes with a criticality score over 2.535 would be identified as critical method nodes. Using the example criticality scores of Table 4, the only method node that would be identified as a critical method node would be method node 6. As another example, if the percentage for critical method nodes is set to the 90$^{th}$ percentile, then any method nodes with a criticality score over 2.184 would be identified as critical method nodes. Using the example criticality scores of Table 4, the method nodes that would be identified as a critical method nodes would be method node 6 and method node 9.

Critical call sequences can also be determined based on the critical method nodes. Using the above example where method node 6 and method node 9 are identified as critical method nodes, call sequence 220 (which contains method nodes 6 and 9) would be identified as a critical call sequence. A criticality score can then be calculated for call sequence 220, which in some implementations is the average of the critical method nodes: (2.89+2.248)/2=2.569.

Figure 4:
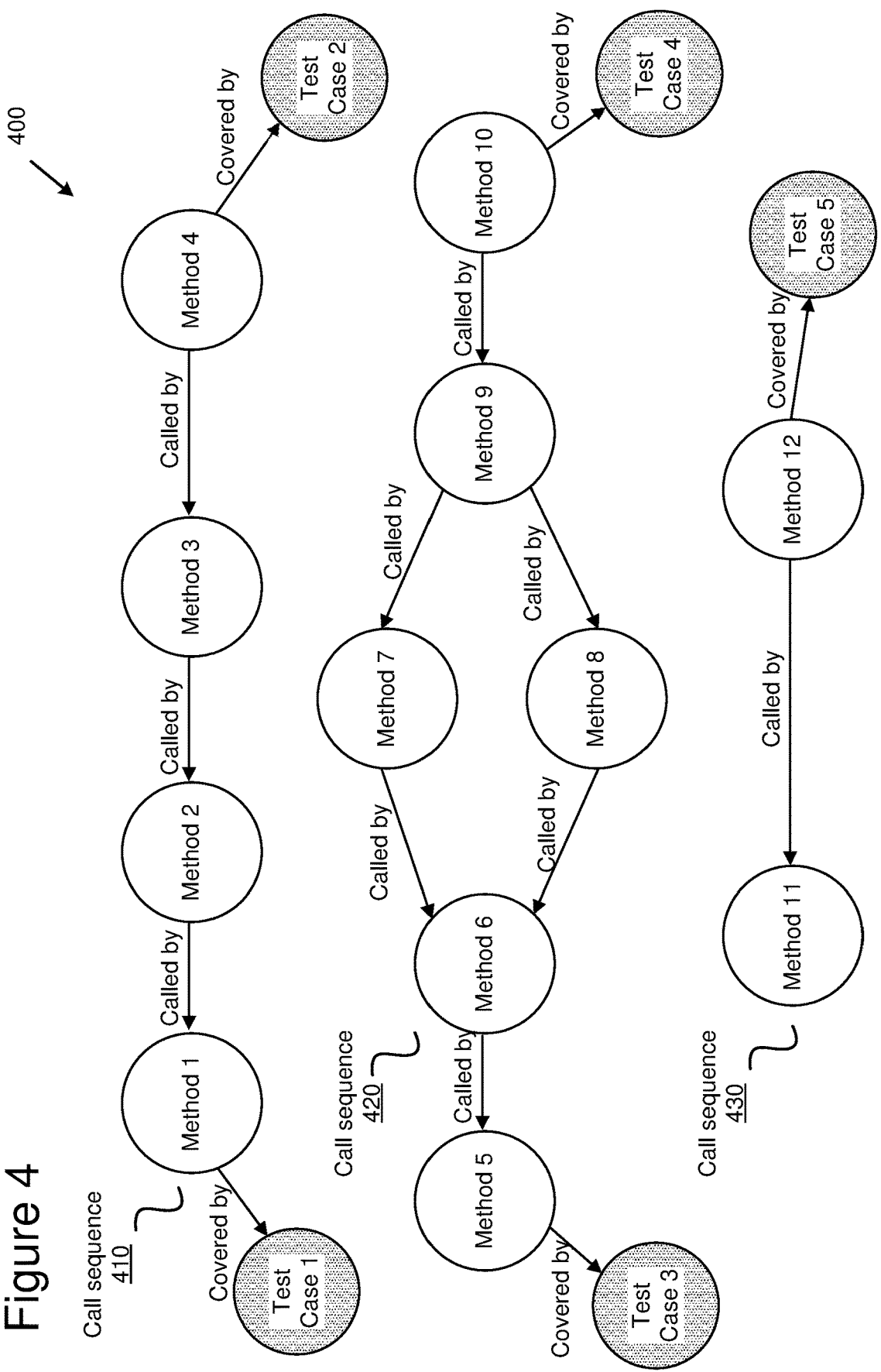
FIG. 4 is a diagram depicting an example call graph comprising multiple call sequence and including method nodes and test case nodes.

FIG. 4 is a diagram depicting an example call graph 400 comprising multiple call sequence and including method nodes and test case nodes. The example call graph 400 contains call sequences corresponding to those depicted in example call graph 200, with the addition of test case nodes. Specifically, example call graph 400 depicts call sequence 410 that includes method nodes 1 through 4 and test case nodes 1 and 2. Call sequence 420 includes method nodes 5 through 10 and test case nodes 3 and 4. Call sequence 430 includes method nodes 11 and 12, and test case node 5.

In some implementations, the test cases that are selected for initiation depend, at least in part, on the criticality scores of the method nodes. For example, test cases that are directly connected to critical method nodes and/or test cases that are connected to method nodes of a critical call sequence can be selected for initiation.

Test case selection can also be performed based on changes to the code base. For example, if there are test case nodes connected to critical method nodes that also had code changes (e.g., due to a most recent code commit) and/or test case nodes connected to critical call sequences containing method nodes that had code changes, then a decision can be made to run an entire test suite of test cases. Otherwise, fewer test cases than the entire test suite can be run.

To illustrate the decision of whether to run an entire test suite of test cases, consider a scenario in which example call graph 400 is generated based on a code change in which only method nodes 7 and 8 were affected by the code change (i.e., the code of the methods corresponding to the other method nodes did not change), and for which method nodes 6, 7, 8, and 9 have been determined to be critical method nodes (based on the calculation depicted in Table 4). In this scenario the entire test suite would be run (in this scenario, the entire test suite is test cases 1 through 5) because the changed method nodes 7 and 8 are also critical method nodes, and also because changed critical method nodes 7 and 8 are part of critical call sequence 420. However, if this scenario is modified so that method node 12 is the only changed method node (instead of method nodes 7 and 8), then only test case 5 would be run because method node 12 is not a critical method node and call sequence 430 is not a critical call sequence.

Methods for Identifying Critical Method Nodes in a Software Code Base

In the technologies described herein, methods can be provided for identifying critical method nodes, and their corresponding methods, in a software code base using a call graph. For example, identification of the critical method nodes can be performed by a criticality analyzer, such as criticality analyzer 110. The critical method nodes are identified based on centrality values calculated by various centrality algorithms.

Figure 5:
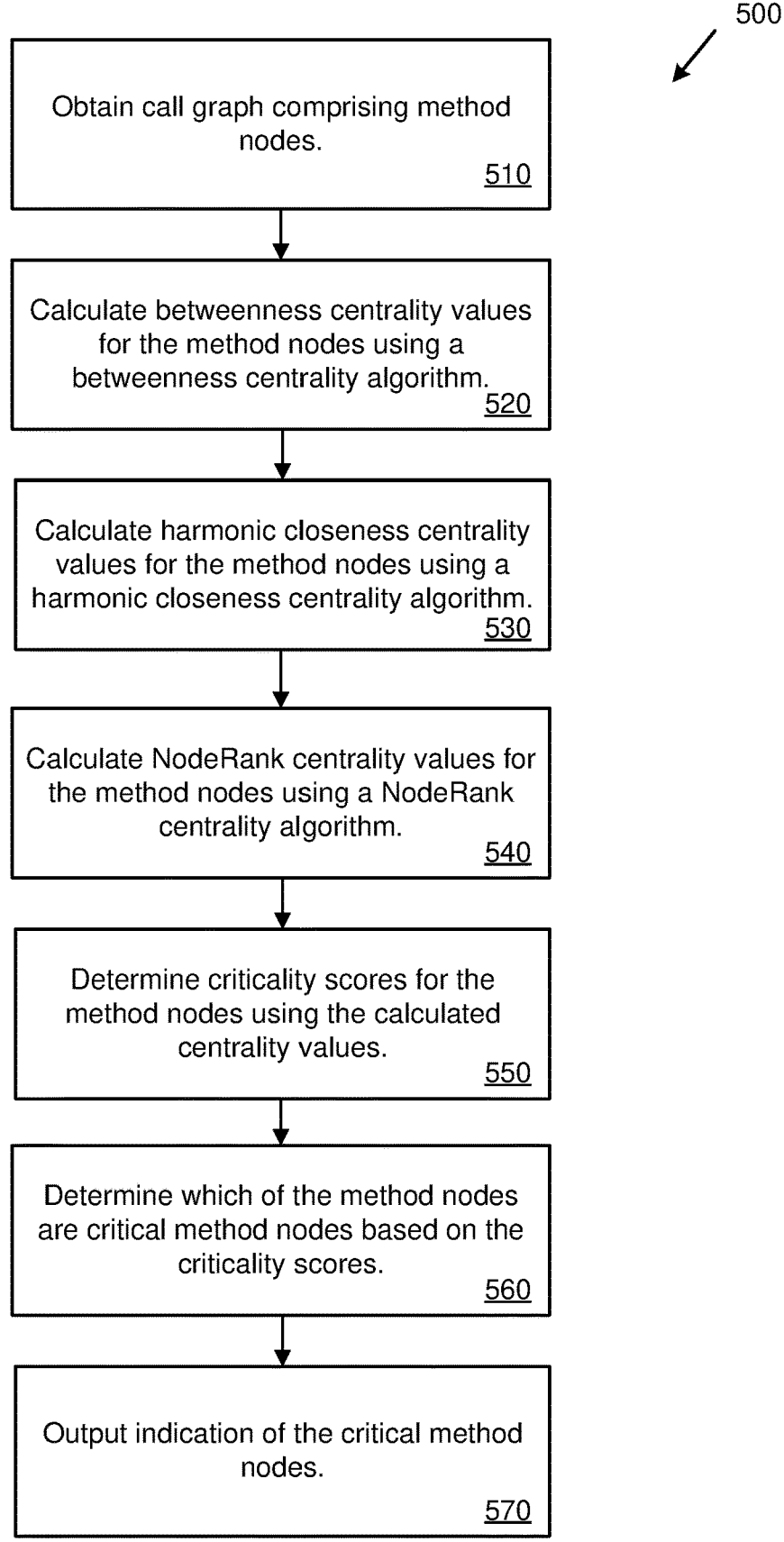
FIG. 5 is a flowchart of an example process for identifying critical methods in a software code base using centrality algorithms.

FIG. 5 is a flowchart of an example process 500 for identifying critical method nodes in a software code base. At 510, a call graph is obtained. The call graph comprises method nodes corresponding to the methods in the software code base, and the method nodes are organized into a plurality of call sequences. The method nodes represent control flow relationships (e.g., called by relationships) between the methods in the software code base.

At 520, betweenness centrality values are calculated for the method nodes using a betweenness centrality algorithm. At 530, harmonic closeness centrality values are calculated for the method nodes using a harmonic closeness centrality algorithm. At 540, NodeRank centrality values are calculated for the method nodes using a NodeRank centrality algorithm.

At 550, criticality scores are determined for the method nodes using, at least in part, the calculated centrality values (the betweenness centrality values, the harmonic closeness centrality values, and the NodeRank centrality values). In some implementations, the centrality values are normalized before they are used to calculate the criticality scores. In some implementations, calculation of the criticality scores includes weighting the values of each algorithm independently. In some implementations, the criticality scores can be calculated using just one or two of the centrality algorithms (e.g., using the betweenness centrality values, the harmonic closeness centrality values, and/or the NodeRank centrality values).

At 560, the method nodes that are critical method nodes are determined based, at least in part, on the criticality scores. For example, the method nodes whose criticality scores are above a criticality threshold are identified as the critical method nodes.

At 570, an indication of the critical method nodes are output. In some implementations, the indication of the critical method nodes is used to perform automated testing.

Figure 6:
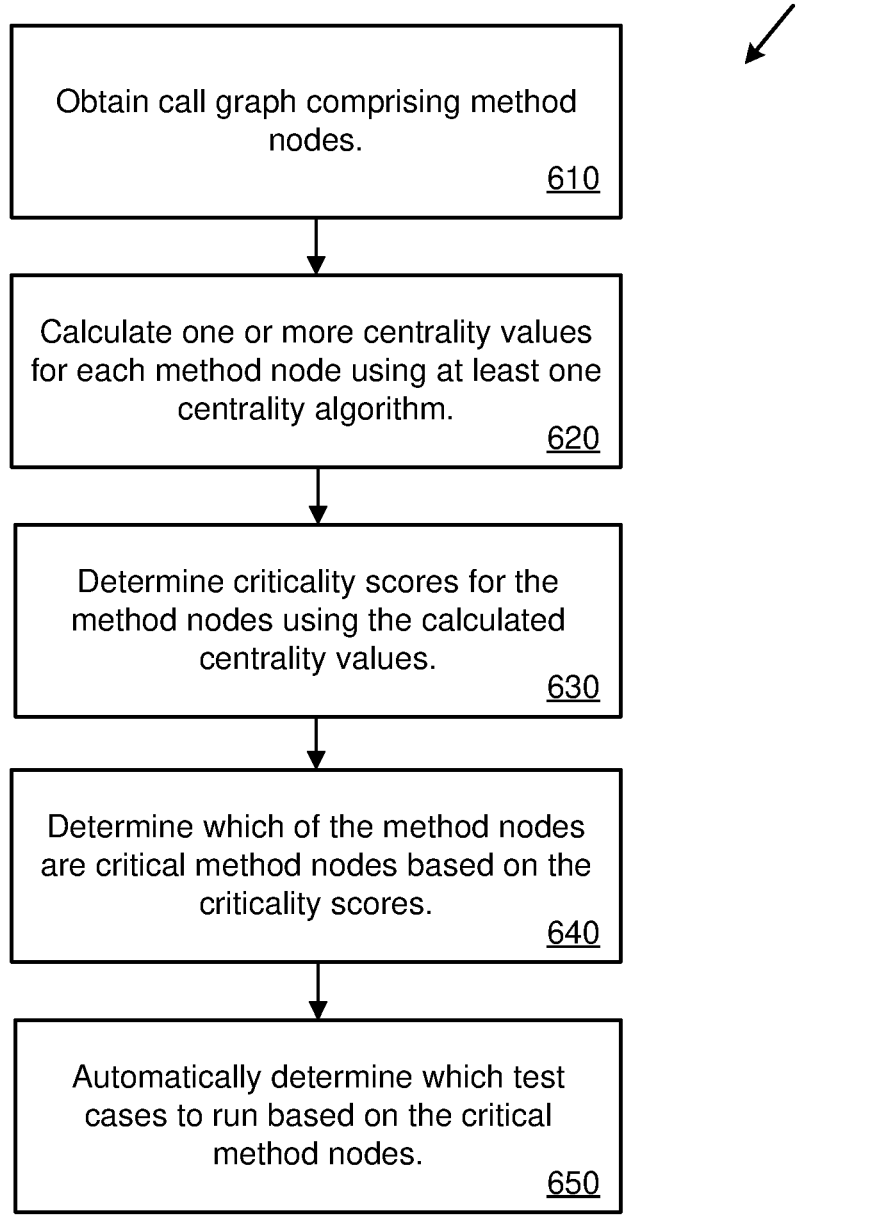
FIG. 6 is a flowchart of an example process for identifying critical methods in a software code base using one or more centrality algorithms.

FIG. 6 is a flowchart of an example process 600 for identifying critical method nodes in a software code base. At 610, a call graph is obtained. The call graph comprises method nodes corresponding to the methods in the software code base, and the method nodes are organized into a plurality of call sequences. The method nodes represent control flow relationships (e.g., called by relationships) between the methods in the software code base.

At 620, one or more centrality values are calculated for each method node using at least one centrality algorithm. Centrality values can be calculated using a betweenness centrality algorithm, a harmonic closeness centrality algorithm, and/or a NodeRank centrality algorithm.

At 630, criticality scores are determined for the method nodes using, at least in part, the betweenness centrality values, the harmonic closeness centrality algorithms, and/or the NodeRank centrality algorithm. In some implementations, the centrality values are normalized before they are used to calculate the criticality scores. In some implementations, calculation of the criticality scores includes weighting the scores of each algorithm independently.

At 640, the method nodes that are critical method nodes are determined based, at least in part, on the criticality scores. For example, the method nodes whose criticality scores are above a criticality threshold are identified as the critical method nodes.

At 650, an automated determination is made regarding which test cases to run based at least in part on the critical method nodes. In some implementations, test cases that are associated with (e.g., directly covering) critical method nodes are selected for running. In some implementations, the decision is whether to run an entire test suite of test cases versus only some of the test cases. For example, the entire test suite can run when at least one of the critical method nodes corresponds to a method with a recent code change.

Computing Systems

Figure 7:
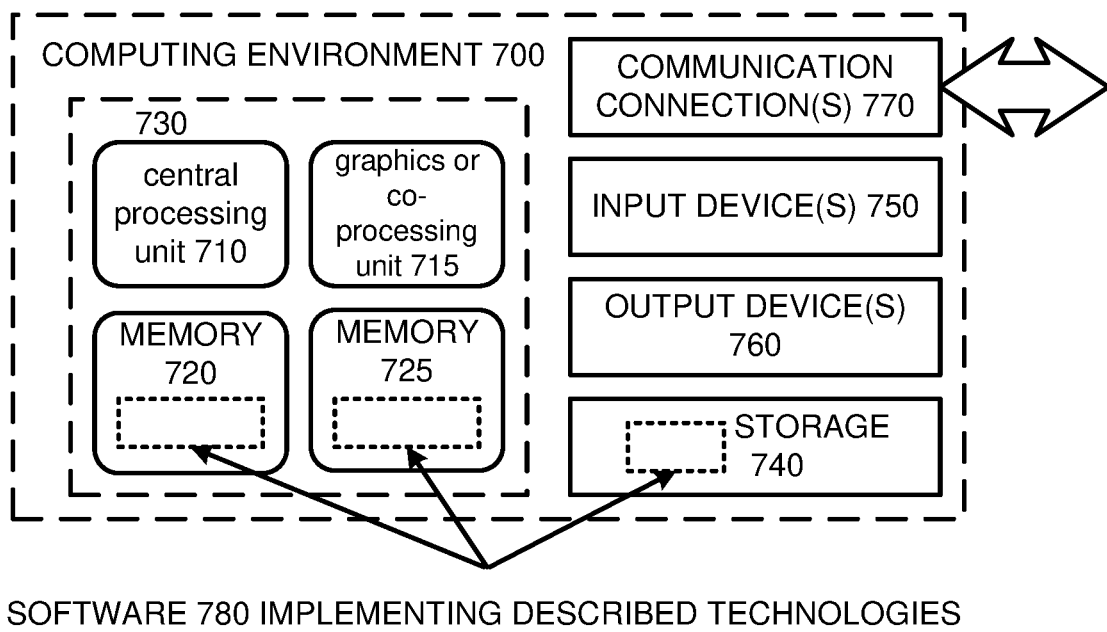
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
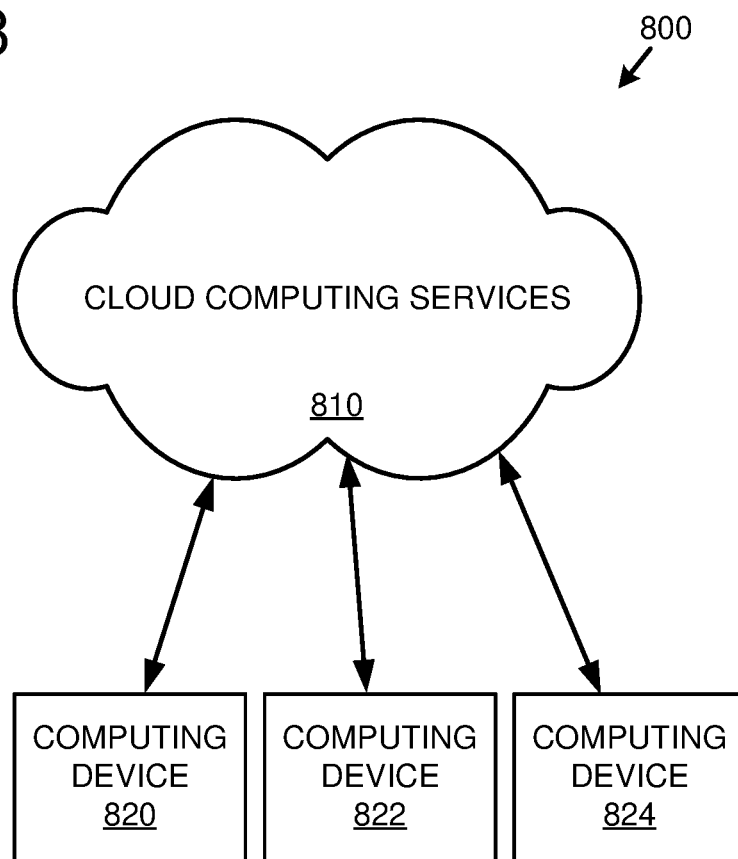
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for identifying critical method nodes in a software code base, the method comprising:
   obtaining a call graph comprising a plurality of call sequences, wherein the call graph comprises method nodes corresponding to methods in the software code base, wherein the method nodes represent control flow relationships between the methods in the software code base;
   using a betweenness centrality algorithm to calculate betweenness centrality values for the method nodes of the call graph;
   using a harmonic closeness centrality algorithm to calculate harmonic closeness centrality values for the method nodes of the call graph;
   using a NodeRank centrality algorithm to calculate NodeRank centrality values for the method nodes of the call graph;
   determining criticality scores for the method nodes based at least in part on the betweenness centrality values, the harmonic closeness centrality values, and the NodeRank centrality values;
   determining which of the method nodes are critical method nodes based at least in part on the criticality scores for the method nodes;
   determining which of the call sequences are critical call sequences, wherein a call sequence, of the plurality of call sequences, is a critical call sequence when it contains at least one of the critical method nodes;
   determining an average criticality score for each of the critical call sequences based at least in part on the criticality scores of the critical method nodes of the critical call sequence;
   outputting an indication of ordering the of the critical call sequences based at least in part on the average criticality scores;
   outputting an indication of the critical method nodes;
   automatically determining whether to run an entire test suite of test cases based at least in part on the criticality scores for the method nodes;
   when the determination is to run the entire test suite, initiating testing using the entire test suite; and
   otherwise, initiating testing using fewer test cases than the entire test suite.

2. The method of claim 1, wherein calculating the betweenness centrality values comprises, for each method node:
   calculating a sum of shortest paths passing through the method node.

3. The method of claim 1, wherein calculating the harmonic closeness centrality values comprises, for each method node:
   calculating a sum of inverse distances from the method node to other of the method nodes.

4. The method of claim 1, wherein the NodeRank centrality values are calculated, for each method node, by identifying method nodes of secondary importance.

5. The method of claim 1, wherein the betweenness centrality values, the harmonic closeness centrality values, and the NodeRank centrality values are scaled to normalize them before they are used for determining the criticality scores.

6. The method of claim 1, wherein determining the criticality scores for the method nodes comprises:
   weighting the betweenness centrality values by a first weight value;
   weighting the harmonic closeness centrality values by a second weight value; and
   weighting the NodeRank centrality values by a third weight value.

7. The method of claim 1, wherein determining which of the method nodes are critical method nodes based at least in part on the criticality scores for the method nodes comprises, for each method node:
   comparing the criticality score for the method node to a criticality threshold; and
   when the criticality score for the method node is above the criticality threshold, determining that the method node is a critical method node.

8. The method of claim 1, further comprising:
   automatically determining which test cases, of a plurality of test cases, to initiate based at least in part on the determined critical method nodes.

9. One or more computing devices comprising:
   processors; and
   memory;
   the one or more computing devices configured, via computer-executable instructions, for identifying critical method nodes in a software code base, the operations comprising:
      obtaining a call graph comprising a plurality of call sequences, wherein the call graph comprises method nodes corresponding to methods in the software code base, wherein the method nodes represent control flow relationships between the methods in the software code base;
      using a betweenness centrality algorithm to calculate betweenness centrality values for the method nodes of the call graph;
      using a harmonic closeness centrality algorithm to calculate harmonic closeness centrality values for the method nodes of the call graph;
      using a NodeRank centrality algorithm to calculate NodeRank centrality values for the method nodes of the call graph;
      determining criticality scores for the method nodes based at least in part on the betweenness centrality values, the harmonic closeness centrality values, and the NodeRank centrality values;
      determining which of the method nodes are critical method nodes based at least in part on the criticality scores for the method nodes;
      determining which of the call sequences are critical call sequences, wherein a call sequence, of the plurality of call sequences, is a critical call sequence when it contains at least one of the critical method nodes;

determining an average criticality score for each of the critical call sequences based at least in part on the criticality scores of the critical method nodes of the critical call sequence;

outputting an indication of ordering the of the critical call sequences based at least in part on the average criticality scores;

outputting an indication of the critical method nodes;

automatically determining whether to run an entire test suite of test cases based at least in part on the criticality scores for the method nodes;

when the determination is to run the entire test suite, initiating testing using the entire test suite; and otherwise, initiating testing using fewer test cases than the entire test suite.

10. The one or more computer-readable storage media of claim 9, wherein determining which of the method nodes are critical method nodes based at least in part on the criticality scores for the method nodes comprises, for each method node:

comparing the criticality score for the method node to a criticality threshold; and when the criticality score for the method node is above the criticality threshold, determining that the method node is a critical method node.

11. The one or more computing devices of claim 9, wherein a subset of the method nodes are identified as associated with methods that have code changes, the operations further comprising:

when the method nodes identified as associated with methods that have code changes include at least one critical method node, determining to run the entire test suite of test cases; and otherwise, initiating testing using fewer test cases than the entire test suite.

12. One or more computer-readable storage media storing computer-executable instructions for execution on one or more computing devices to perform operations for identifying critical method nodes in a software code base, the operations comprising:

obtaining a call graph comprising a plurality of call sequences, wherein the call graph comprises method nodes corresponding to methods in the software code base, wherein the method nodes represent control flow relationships between the methods in the software code base;

calculating one or more centrality values for each method node using at least one of:

a betweenness centrality algorithm to calculate betweenness centrality values for the method nodes of the call graph;

a harmonic closeness centrality algorithm to calculate closeness centrality values for the method nodes of the call graph; or a NodeRank centrality algorithm to calculate NodeRank centrality values for the method nodes of the call graph; and determining criticality scores for the method nodes based at least in part on the betweenness centrality values, the closeness centrality values, and/or the NodeRank centrality values;

determining which of the method nodes are critical method nodes based at least in part on the criticality scores for the method nodes;

determining which of the call sequences are critical call sequences, wherein a call sequence, of the plurality of call sequences, is a critical call sequence when it contains at least one of the critical method nodes;

determining an average criticality score for each of the critical call sequences based at least in part on the criticality scores of the critical method nodes of the critical call sequence;

outputting an indication of ordering the of the critical call sequences based at least in part on the average criticality scores; and automatically determining which test cases to run based at least in part on the determined critical method nodes, wherein automatically determining which test cases to run comprises:

automatically determining whether to run an entire test suite of test case based at least in part on the criticality scores for the method nodes;

when the determination is to run the entire test suite, initiating testing using the entire test suite; and otherwise, initiating testing using fewer test cases than the entire test suite.

13. The one or more computing devices of claim 12, wherein determining which of the method nodes are critical method nodes based at least in part on the criticality scores for the method nodes comprises, for each method node:

comparing the criticality score for the method node to a criticality threshold; and when the criticality score for the method node is above the criticality threshold, determining that the method node is a critical method node.

\* \* \* \* \*